W. S. LIVENGOOD.
BALING PRESS.
APPLICATION FILED JAN. 11, 1911.

1,032,616.

Patented July 16, 1912.

Witnesses
Frank R. Glon
H. C. Rodgers.

Inventor
W. S. Livengood
By George H. Thorpe Atty.

W. S. LIVENGOOD.
BALING PRESS.
APPLICATION FILED JAN. 11, 1911.

1,032,616.

Patented July 16, 1912.
5 SHEETS—SHEET 4.

Fig. 4.

Witnesses
Frank R Horn
H.C. Rodgers.

Inventor
W. S. Livengood
By George H Thorpe Atty.

UNITED STATES PATENT OFFICE.

WINFIELD S. LIVENGOOD, OF KANSAS CITY, MISSOURI.

BALING-PRESS.

1,032,616.  Specification of Letters Patent.  Patented July 16, 1912.

Application filed January 11, 1911. Serial No. 602,094.

*To all whom it may concern:*

Be it known that I, WINFIELD S. LIVENGOOD, a citizen of the United States, residing at Kansas City, in the county of Jackson and State of Missouri, have invented certain new and useful Improvements in Baling-Presses, of which the following is a specification.

This invention relates to baling presses and has for its object to produce an efficient and reliable hay press which can be operated at a minimum expenditure of power and in which energy is stored up with each return movement of the head-block and utilized to assist in each advance movement of the same.

A further object is to produce a baling press provided with a feeder and adjustable means for effecting the automatic release of the feeder at any predetermined point in its operative or feeding stroke.

A further object is to produce means whereby the feeder may be prematurely released in the event it encounters an unyielding obstruction and thus avoid injury or breakage from such encounter.

A still further object is to produce a baling press provided with a reciprocatory head-block and an oscillatory feeder, and means whereby the feeder shall be caused to swing quickly into the baling case and out of the same in the interim between the return and advance movements of the head-block.

With these objects in view and others as hereinafter appear, the invention consists in certain novel and peculiar features of construction and organization as hereinafter described and claimed; and in order that it may be fully understood reference is to be had to the accompanying drawings, in which—

Figure 2:
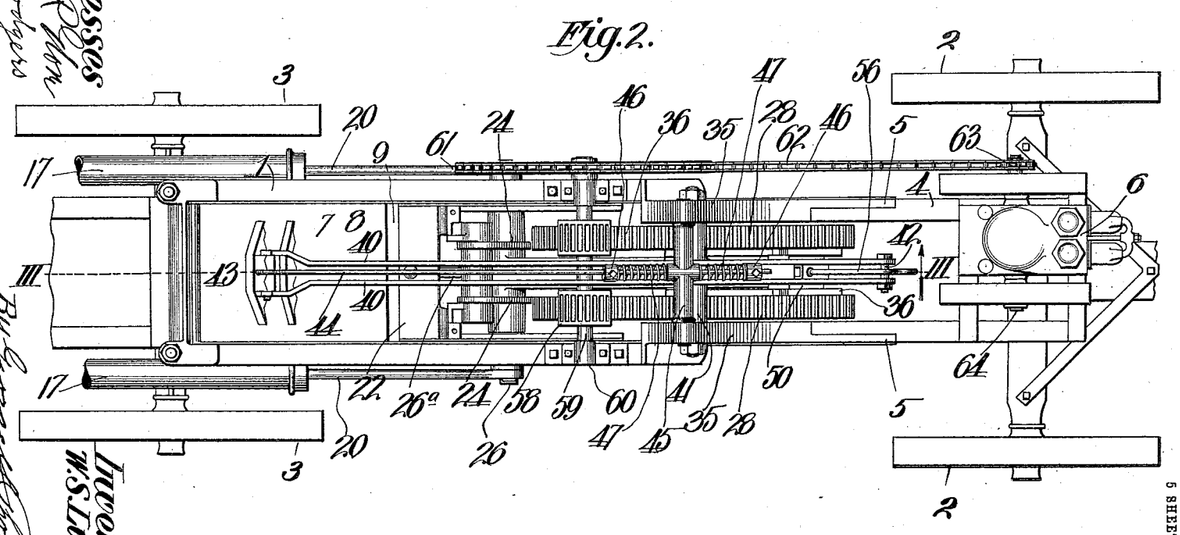
Fig. 2, is a top plan view of the same.

In the said drawings, where like reference characters identify corresponding parts in all the figures, 1 indicates the body of the baling press and 2 and 3 the carrying wheels thereof. Preferably one end 4, of the body including the wheels 2, will be detachable, the drawings, Fig. 2, showing it lap-jointed in position at 5, and said detachable end may be utilized as the support for a gas engine 6, or other motor, whereby the baling operation may be effected. Obviously the possessor of a machine of the character outlined, may utilize his engine for other purposes, and easily move it to the point desired upon the wheels 2.

The baling chamber 7, of the press communicates with the customary top feed-opening 8 to receive baling material from the hopper, not shown. The bottom of the baling chamber is provided with an opening 9, and extending across and near the front end of said opening is a bridge plate 10, depressed at its center to form an opening 11, and provided at opposite sides and at the rear end of said opening with shoulders 12,—preferably pitched upward and rearward at a slight angle—for a purpose which hereinafter appears, the bridge plate being preferably so located with respect to opening 9, that chaff and waste may be brushed therethrough to the ground.

For the purpose of causing the engine to effect a storage of power when otherwise performing no work, and for utilizing said power in assisting the engine to effect the condensing of the baling material preliminary to the final compression thereof, the side walls of the baling chamber are provided with longitudinal slots 13, reinforced by correspondingly slotted plates 14, secured to the outer sides of said walls and formed with outwardly projecting tracks 15, and forward of said tracks 15 the body is provided with a pair of brackets 16, to which are pivoted for movement in a vertical plane tubular casings 17, containing expansive coiled springs 18, and plungers 19, the springs tending to force the plungers to the front ends of the casings, and said plungers are provided with stems 20, pivotally engaging the ends of a transverse rod hereinafter referred to.

21 is a rod carried by the head-block 22 arranged to reciprocate within the baling chamber, the head-block being of any suitable or preferred type and provided with the customary apron 22ª. Pivoted to rod 21 is a pair of links 23 and pivotally connected to said links is a link 24 pivoted to the pitman 25 by a rod 26 projecting through slots 13 and engaged at its ends by stems 20, friction being eliminated by equipping rod 26 with rollers 27 in engagement with the tracks 15. The pitman 25 is arranged between and pivotally connected to a cross rod 29 connecting a pair of similar gear wheels 28, and forming therewith a crank shaft. The links 23 and 24 constitute a toggle connection between the pitman 25 and the head-block 22, and said toggle link 24 is formed with an angle-shaped extension 30, connected by a retractile spring 31 to a bracket 32, or other fixed point of the press, said springs 31 extending through the opening 11 formed by the depressed portion of the bridge portion 10. The function of said spring is to hold the link 24 with its rollers 33 into close contact with the inclined shoulders 12 during the preliminary or long part of the advance of the plunger and shortly after the return movement of the plunger begins, pull the said rollers down through opening 9, and hold them against the shoulders 12, as fulcrum whereby the withdrawing pitman may quickly contract the toggle and complete the withdrawal of the plunger, it being noted that link 24 carries a roller 26ª to engage the bottom of the baling chamber when the toggle is fully expanded so that the latter part of the advance of the plunger shall correspond in speed and power to the latter part of the advance of the pitman.

The wheels 28 are rigidly formed with alined stub shafts 34, journaled in castings 35 secured to the front end of the body, and at their inner sides said wheels are formed with tracks consisting of semi-circular portions 36 terminating in inwardly sloping cam ends 37 and 38 for a purpose hereinafter explained.

Figure 1:
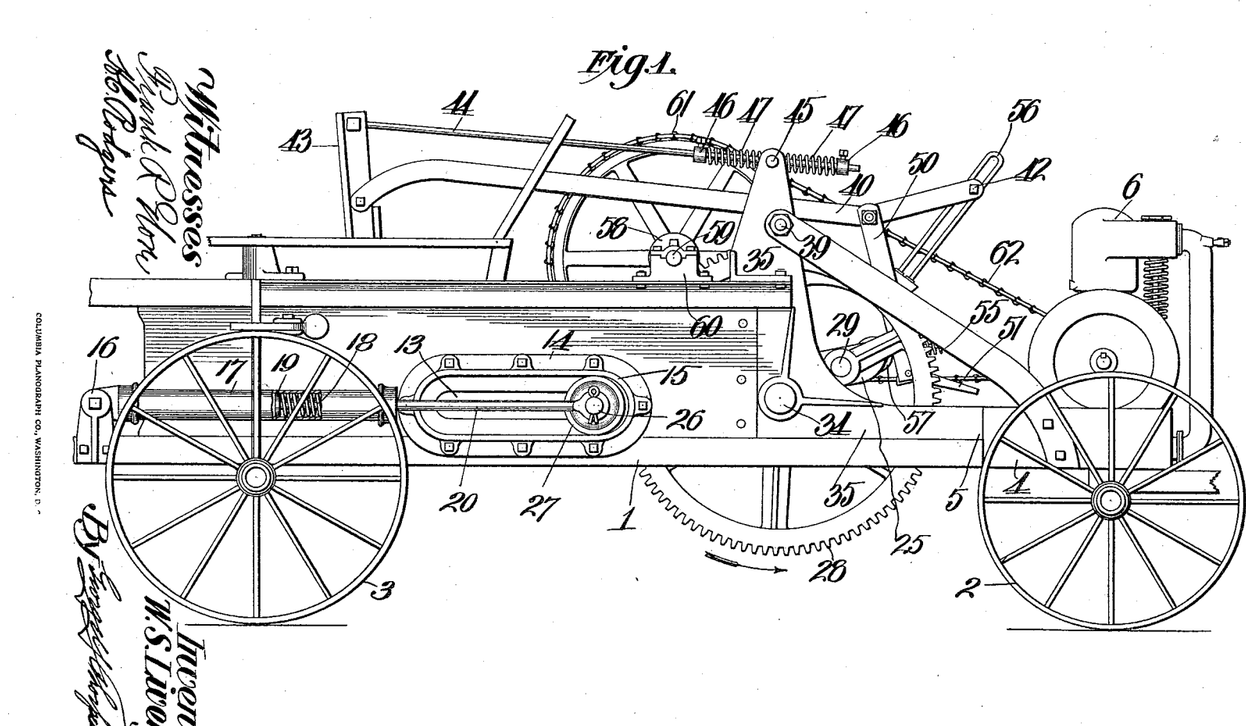
Figure 1, is a side elevation of a baling press embodying my invention.
Figure 4:
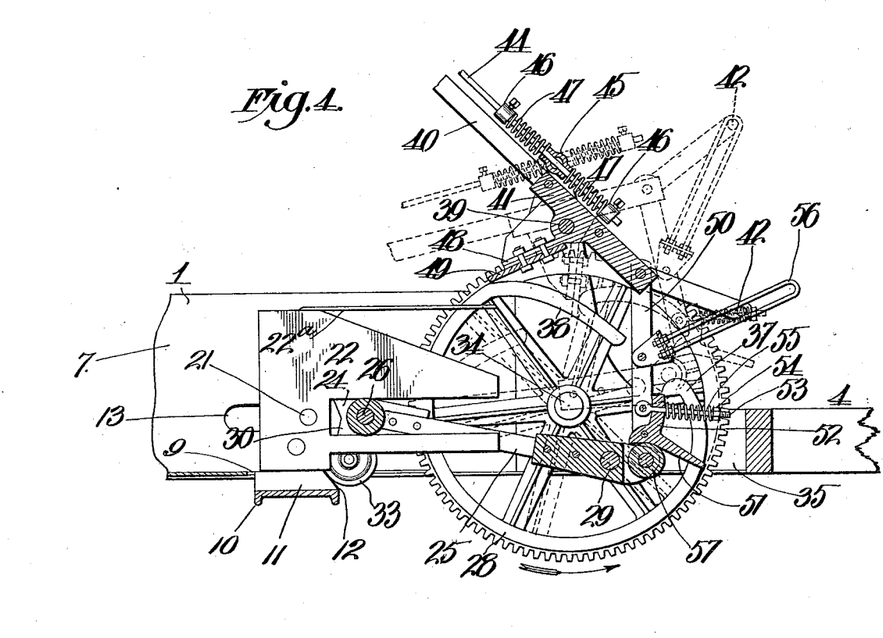
Fig. 4, is a similar view with the head-block in elevation and at the end of its return stroke, said figure also showing the feeder elevated and about to be swung downward into the baling chamber.
Figures 5, 6, 7:
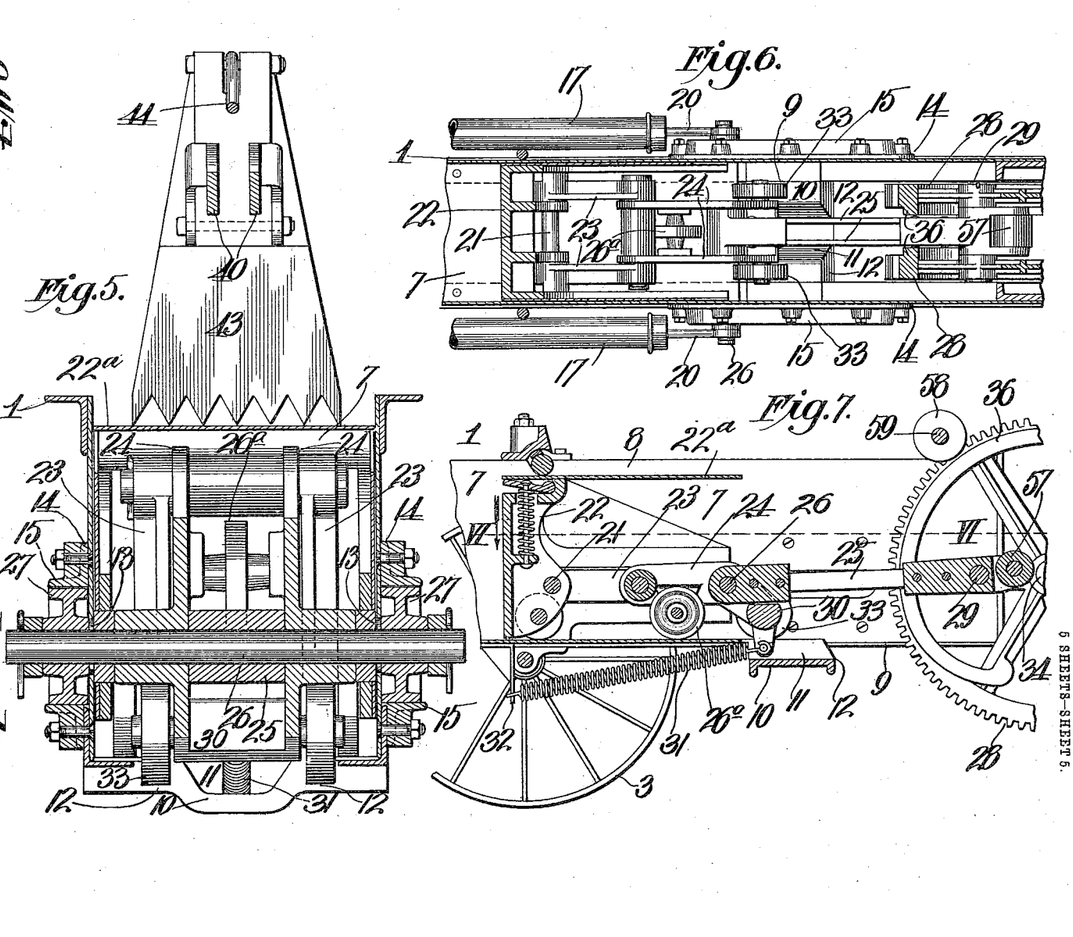
Fig. 5, is an enlarged vertical transverse section on the line V—V of Fig. 3.
Fig. 6, is a horizontal section on the line VI—VI of Fig. 7.
Fig. 7, is a central vertical section to show the head-block at the extremity of its advanced stroke.

Pivoted on a cross rod 39 connecting and carried by the castings 35, is a feeder for forcing baling material from the hopper into the baling chamber. Said feeder consists of a swing arm preferably consisting of a pair of parallel bars 40, secured to opposite sides of the hub portion 41 mounted on the rod 39, and said arm is provided rearward of its pivotal point with a trip pin 42, the same being preferably in the form of a cross-pin connecting bars 40. Pivoted to the front end of the arm is a head 43, of the type shown or of any other suitable or preferred type, and pivotally connected to the upper end of the head is a feeder-adjusting rod 44, extending slidingly through a rock shaft 45, journaled in the upper ends of the castings 35. The rod 44 is provided with a pair of adjustable collars 46, at opposite sides of the rock shaft 45, and interposed between the latter and said collars is a pair of expansive coiled springs 47, which are alternately compressed in the up and down movements of the feeder and tend to compel the head of the same to stand substantially at right angles to the length of the baling chamber while within the same and thus effectively force loose material from the hopper into the baling chamber and withdraw from the latter without carrying the baling material with it. The hub portion of the feeder is provided with an arm 48 for a purpose which hereinafter appears, and said arm is equipped with a wear plate 49. Hanging pivotally from the swing arm of the feeder between the pivotal point thereof and pin 42 is an arm 50, equipped at its lower end with a pivoted trigger 51, having an arm 52 through which extends a bolt 53 pivoted to said arm 50, and mounted upon the bolt is a nut 54, and a helical spring 55, which bears at its opposite ends against the nut and arm 52 to hold the trigger in set or operative position, as shown in Figs. 1 and 4. For the purpose of releasing the feeder at the end of its down or operative movement, or at any predetermined time, without pivotally operating the trigger, a link 56 is pivoted at one end to arm 50 and fits slidingly on the pin 42 of the feeder arm 40, the relation being such that the pin 42 at a certain time, pulls upward on the link 56, and compels the same to swing the arm 50, toward the rear end of the machine and thus withdraw the trigger from the path of the anti-friction roll 57, journaled in the front end of the pitman 27. Should it be desired to shorten the down-stroke of the feeder it can be accomplished by pivoting the loose end of the link to the swing arm 50 at a greater distance from the point of suspension of the latter so that the pin 42 shall engage the upper end of said link at an earlier period in the movement of the feeder.

To operate the machine, gear wheels 28 mesh with the gear pinions 58 secured upon a shaft 59, journaled in bearings 60 of the body of the press, and at one end the shaft is equipped with a sprocket wheel 61, connected by a sprocket chain 62 to the sprocket wheel 63 on the shaft of the engine 6.

Figure 3:
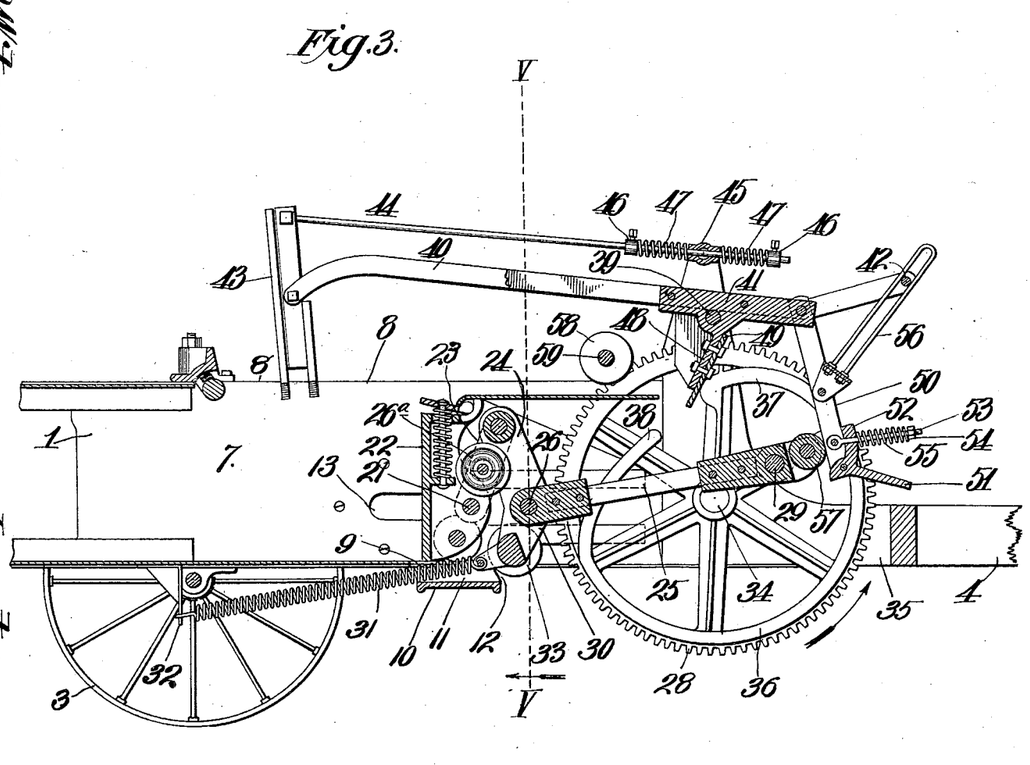
Fig. 3, is a central vertical section of the machine with the head-block just starting on its advance stroke and the feeder sufficiently advanced in its upward movement to provide clearance for the head-block.

Assuming that the parts occupy the position shown in Figs. 1 and 3, and that the wheels 28 are rotating in the direction indicated by the adjacent arrows, it will be seen that the cam ends 37 of brackets 36 are in engagement with the wear plate 49 and have lifted the feeder above the plane of the head-block 22. It will also be apparent by reference to Fig. 3, that the head-block has just begun its compression stroke. As the rotation continues, the feeder is quickly elevated by cam 37, until the wear plate rests upon the tracks 36, and remains in such elevated position until after the head block has completed its compression stroke and has made a part of its return stroke.

In the compression stroke of the pitman, which almost imperceptibly begins when the parts are in the position shown in Fig. 3, the pressure of the pitman on link 24 causes the same, as explained, to fulcrum at the points of engagement of its rollers 33 on shoulders 12, and thus tend to swing toward the plunger and force the same rearwardly, this initial rearward action being almost wholly effected through the expansion of the toggle constituted by links 23 and 24, it being apparent that this expansion occurs in approximately one-eighth of a revolution of wheel 28, and it is further apparent that the expansion of the toggle is rapid and that the plunger therefore makes a large proportion of its power stroke when the baling material is loose and offers but slight resistance. By the time material resistance is offered by the condensing of the material being baled, the toggle is straight and the rollers 33 have cleared shoulders 12 and rest upon the bottom of the baling case, so that for the remainder of its stroke, the speed of the plunger and front end of the pitman corresponds and both occur as the pivot 29 travels downward from a point above to a point below the plane of the axis of its line of travel. It will thus be seen that I have provided for rapid movement of the plunger when the work performed is light and for slow movement under maximum leverage when the work is heavy. On the return movement of the plunger the rollers 33 travel toward the shoulders 12 and in such travel slightly increase the tension of spring 31 so that said spring will pull the rollers downward on said shoulders and thus give the pitman a fulcrum for effecting almost instant collapse of the toggle and completion of the return movement of the plunger, it being understood that this collapse does not occur until the pitman has nearly attained the position shown in Fig. 4, and that as it attains such position, it engages the face of the trigger 51 and starts to lift the same and hence effect the depression of the feeder, it being noticed in this connection that this depression is rapid and occurs at a time when the machine is doing no work, in fact at the time when the pivot or crank 29 is traveling from a point below to a point above its axis of travel and hence during the lost-motion period of the machine. It will also be seen that although the feeder moves downward rapidly, it cannot fall down because it is restrained by the travel of the wear plate on the cam portions 38 of the bracket. Eventually the wear plate and arm 48 drop through the opening between the adjacent ends of the cams 38 and 37, and in so doing the lift pin 42 is caused to engage the upper end of link 56 and exert an upward pull thereon to swing arm 50 forward until the trigger is withdrawn from the path of roller 57. Immediately this occurs the continued rotation of wheels 28, cause the inner end of cams 37 to engage the wear plate and begin the re-elevation of the feeder, this reëlevation being rapid as will be apparent by reference to the length of said cam, so that in the interim between the elevation of the feeder and the expansion of the toggle, which is rapid as explained, the attendant has ample time in which to deposit baling material in the hopper.

As hereinbefore stated the feeder is forced down when the engine has the least work to perform, and to equalize the work and thus effect a smoother and more uniform operation of the engine and therefore render unnecessary the use of a fly or balance wheel, I have provided springs 18 which are compressed by the return movement of the plunger to store up power which coöperates with the pitman in effecting the succeeding advance of the plunger and thus prevents sudden imposition of resistance to the engine when it is called upon to exert the maximum force.

From the above description it will be apparent that I have produced a baling press possessing the features of advantage enumerated as desirable and I wish it to be understood that I do not desire to be restricted to the exact details of construction shown and described as obvious modifications will suggest themselves to one skilled in the art.

I claim:—

1. In a baling press, a baling case, a feeder to force baling material into the baling case, a driven device, movable means to be engaged and caused by said device to move the feeder into the baling case, and means movable with the feeder for effecting disengagement between said driven device and said first-named movable means when the feeder occupies a predetermined position within the baling case.

2. In a baling press, a baling case, a feeder to force baling material into the baling case, a driven device, movable means to be engaged and caused by said device to move the feeder into the baling case, and means actuated by the feeder upon attaining a predetermined point within the baling case to effect disengagement between the said device and said movable means.

3. In a baling press, a baling case, a feeder to force baling material into the baling case, a driven device, movable means to be engaged and caused by said device to move the feeder into the baling case, and means movable with the feeder for withdrawing said first-named movable means from the path of the driven device when the feeder has attained a predetermined position in the baling case.

4. In a baling press, a baling case, a feeder to force baling material into the baling case, a driven device, a swing arm pendent from the feeder and adapted to be pushed upward by said driven device to cause the feeder to enter the baling case, and a link pivoted to said swing arm and bearing a pin-and-slot connection with the feeder and adapted to be caused by the feeder as it attains a predetermined position within the baling case to pull the swing arm out of the path of said driven device.

5. In a baling press, a baling case, a feeder to force baling material into the baling case, a driven device, a swing arm pendent from the feeder at the opposite side of the pivotal point thereof from its head and adapted to be pushed upward by said driven device to cause the feeder to enter the baling case, a pin projecting from the feeder rearward of said swing arm, and a slotted link pivoted at one end to said swing arm and slidingly engaging said pin.

6. In a baling press, a baling case, a feeder to swing into and out of the baling case, a driven device, an arm suspended from the feeder rearward of its pivotal point, a trigger pivoted to said arm, and yielding means engaging the trigger and adapted to yield and permit the trigger to trip in the event the feeder is arrested before completing its stroke into the baling case.

7. In a baling press, a baling case, a feeder to force baling material into the baling case, a driven device, movable means to be engaged and caused by said device to move the feeder into the baling case, means to retard the movement of the feeder, and means for effecting disengagement between said device and said movable means when the feeder occupies a predetermined position within the baling case.

8. In a baling press, a baling case, a feeder to force baling material into the baling case, a driven device, movable means to be engaged and caused by said device to move the feeder into the baling case, means movable with the said driven device for retarding the movement of the feeder, and means for effecting disengagement between said device and said first-named movable means when the feeder occupies a predetermined position within the baling case.

9. In a baling press, a baling case, a feeder to force baling material into the baling case, a driven device, movable means to be engaged and caused by said device to move the feeder into the baling case, a cam track movable with said driven means for retarding said movement of the feeder, and means for effecting disengagement between said device and said movable means when the feeder occupies a predetermined position within the baling case.

10. In a baling press, a baling case, a feeder to force baling material into the baling case, a driven device, movable means to be engaged and caused by said device to move the feeder into the baling case, means for effecting disengagement between said device and said movable means when the feeder occupies a predetermined position within the baling case, and means for returning the feeder to its original position.

11. In a baling press, a baling case, a swing arm, a part rigid with and extending at an angle to said swing arm, a feeder proper carried by said swing arm, to force baling material into the baling case, a driven device, movable means to be engaged and caused by said device to move the feeder into the baling case, means for effecting disengagement between said device and said movable means when the feeder occupies a predetermined position within the baling case, and means movable with the driven device for engaging said rigid part to effect the return of the feeder to its original position.

12. In a baling press, a baling case, a swing arm, a part rigid with and extending at an angle to said swing arm, a feeder proper carried by said swing arm, to force baling material into the baling case, a driven device, movable means to be engaged and caused by said device to move the feeder into the baling case, means for effecting disengagement between said device and said movable means when the feeder occupies a predetermined position within the baling case, and a cam movable with said driven device for engaging said rigid part to effect the return of the feeder to its original position.

13. In a baling press, a baling case, a feeder to swing into and out of the baling case, a pair of cams spaced apart, a semi-circular track connecting the remote ends of the cams, an arm projecting from the feeder, and means to rotate the tracks and cams to cause one of the latter to engage said arm and raise the feeder, the semi-circular track to then engage the arm and hold the feeder elevated and then the other cam to engage the arm and permit the feeder to descend until said arm swings through the space between the cams and is reëngaged by the other cam.

14. In a baling press, a baling case, a feeder, to swing into and out of the baling case, a pair of cams spaced apart, a semi-circular track connecting the remote ends of the cams, an arm projecting from the feeder, means to rotate the tracks and cams to cause one of the latter to engage said arm and raise the feeder, the semi-circular track to then engage the arm and hold the feeder elevated and then the other cam to engage the arm and permit the feeder to descend until said arm swings through the space between the cams and is reëngaged by the other cam, and means rotatable with the track for effecting the movement of the feeder into the baling case under heavy pressure.

15. In a baling press, a baling case, a pair of rotating wheels connected together and constituting a crank, a feeder suitably pivoted above said crank and provided with a depending arm, semi-circular tracks bearing a rigid relation to said wheels, cams extending inwardly from opposite ends of said semi-circular tracks, connections whereby pressure is transmitted from the crank onto the feeder to lower the latter during the interim when said arm of the feeder is in engagement with one of said cams, and means whereby the connection between the crank and the feeder is broken as the latter attains a predetermined position within the baling case to permit the other cam to engage said arm and reëlevate the feeder, and a semi-circular track to then engage said arm and hold the feeder elevated.

16. In a baling press, a baling case having a bottom opening, a plate rigid with the case and bridging said bottom opening and depressed centrally to provide a space between it and the plane of the bottom of the case, a reciprocatory head block within the case, a pitman extending into the case, a toggle consisting of a link pivoted to the head block, and a second link pivoted at its upper end to the upper end of the first-named link and pivotally connected between its ends to the front end of the pitman and provided at its lower end with a lug adapted when the toggle is retracted to extend forwardly with respect to the baling case and when the toggle is expanded to extend downwardly through said bottom opening, and a retractile spring tending to resist expansive or opening movement of the toggle and connected at one end to said lug and at its opposite end to a point on the machine fixed with respect to the baling case, said spring extending into the space formed by and between the said bridge plate and the baling case.

17. In a baling press, a baling case having a bottom opening, a plate bridging said opening and provided with a depressed central portion spaced from and below the plane of the bottom of the case and at opposite sides of said depressed portion forming a pair of rearwardly facing shoulders, a reciprocatory head block in the case, a pitman, a toggle pivotally connecting the pitman and head block and consisting of a pair of front links pivoted at their front ends to the head block and a rear link pivoted at its front end to the rear ends of said pair of links and pivoted near its rear end to the front end of the pitman and provided rearward of its pivotal point with the pitman with a pair of rollers, and a retractile spring connected to the rear extremity of the link equipped with the rollers or to normally hold the latter yieldingly against the said shoulders; said springs extending through the space formed by and between the bottom of the baling case and the depressed portion of the said bridge plate.

18. In a baling press, a baling case, a feeder to force baling material into the baling case, a driven device, means movable bodily with and also independently of the feeder to be engaged and caused by the said device to move the feeder into the baling case, and movable means for effecting disengagement between said driven device and said first-named movable means when the feeder occupies a predetermined position within the baling case.

19. In a baling press, a baling case, a feeder to force baling material into the baling case, a driven device, means movable bodily and also independently of the feeder to be engaged and caused by said device to move the feeder into the baling case, and means movable bodily with the feeder for withdrawing said first-named movable means from the path of the driven device when the feeder has attained a predetermined position in the baling case.

20. In a baling press, a baling case, a reciprocatory head block in said case, means for reciprocating the head block, and means to assist in advancing the head block and offering a yielding resistance to its return movement.

21. In a baling press, a baling case, a reciprocatory head-block in said case, means for reciprocating the head block, and springs to assist in advancing the head block and offering a yielding resistance to its return movement.

22. In a baling press, a baling case having longitudinal slots in its side walls, a reciprocatory head block in the baling case, a cross rod movable in the baling case and projecting through said slots, casings secured at their front ends to fixed points of the press, expansive coiled springs within said casings, plungers within the casings at the front ends of and receiving the thrusts of the springs, and connecting the plungers with the said cross rod.

23. In a baling press, a baling case, a reciprocatory plunger within the case, a toggle connected to the plunger, means for first expanding the toggle and then advancing the same in its expanded condition to respectively advance the plunger and then the expanded toggle and the plunger to complete the stroke of the latter, and means for offering a yielding resistance to the advance of the plunger until the toggle is expanded and then for assisting in the further advance of the plunger and the expanded toggle.

24. In a baling press, a baling case, a reciprocatory plunger within the case, a toggle connected to the plunger, means for first expanding the toggle and then advancing the same in its expanded condition to respectively advance the plunger and then the expanded toggle and the plunger to complete the stroke of the latter, and a spring connected to a fixed point on the baling case and to the toggle for offering a yielding resistance to the advance of the plunger until the toggle is expanded and then for assisting in the further advance of the plunger and the expanded toggle.

25. In a baling press, a baling case having a bottom opening and a shoulder adjacent to said opening, a reciprocatory plunger within the case, a toggle connected to the plunger, a driven shaft, a pitman pivoted thereto and to the adjacent link of the toggle between the ends of said link, and a spring holding the lower or free end of the last-named link projecting through said bottom opening and pressed against said shoulder to form the fulcrum of said link as the toggle swings said link forward and effects the advance of the plunger by expanding the toggle; said spring as the expansion of the toggle ends coöperating with the pitman in imparting forward movement bodily to the toggle to complete the forward stroke of the plunger.

26. In a baling press, a baling case having a bottom opening and a shoulder adjacent to said opening, a reciprocatory plunger within the case, a toggle connected to the plunger, a driven shaft, a pitman pivoted thereto and to the adjacent link of the toggle between the ends of said link, and a retractile spring connected at its rear end to the free end of the link projecting through said bottom opening and at its front end to a point fixed with relation to and below the baling case and holding said free end of said link pressed forwardly against said shoulder; said spring stretching as and retracting after the toggle is expanded by the pitman to respectively resist the preliminary advance of the plunger and coöperate with said pitman in moving the toggle bodily forward within the case to effect the completion of the advance or compression stroke of the plunger.

In testimony whereof I affix my signature, in the presence of two witnesses.

WINFIELD S. LIVENGOOD.

Witnesses:
HELEN C. RODGERS,
G. Y. THORPE.